United States Patent Office 3,384,538
Patented May 21, 1968

3,384,538
COMBATTING INSECTS WITH O-[-2-LOWER ALKYL - QUINOLYL - (8)]N - METHYL CARBAMATES
Ernest Hodel, Basel, Switzerland, assignor to Geigy Chemical Corporation, Greenburgh, N.Y., a corporation of Delaware
No Drawing. Filed June 1, 1965, Ser. No. 460,515
4 Claims. (Cl. 167—33)

The present invention concerns pesticides which contain heterocyclic carbamic acid esters and/or their salts as new active ingredients, and processes for combatting pests using the active ingredients mentioned or agents containing them.

It has been found that new quinolyl-(8) carbamates of the general Formula I:

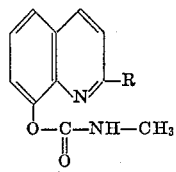

wherein R represents a lower alkyl radical and preferably methyl, are very well suited because of their excellent activity for combatting pests, namely arthropods, e.g. insects and the stages of their development and also of spiders, particularly of the Acarina order, including the Ixodidae. In addition they have the generally known good bactericidal and bacteriostatic properties of 8-hydroxyquinoline derivatives. Because of this broad range of action, these active ingrediennts of the general Formula I are of great importance for the combatting of such pests in the protection of plants and material and also for the protection of household pets and domestic animals from attack by the pests mentioned above.

The methyl or ethyl radical, the propyl and butyl radicals are meant by the lower alkyl radical represented by R in general Formula I.

The new active ingredients of the general Formula I are produced by reacting an 8-hydroxyquinoline derivative with methyl isocyanate or with methyl carbamic acid chloride or with a mixture of the two latter compounds, the reaction optionally being performed in a solvent which is inert to the reaction partners and advantageously in the presence of a proton acceptor. If desired, the reaction products are converted into the corresponding salts with organic or inorganic acids. The active ingredients of general Formula I are stable in water and they dissolve well in the usual organic solvents.

The insecticidal and acaricidal activities of compounds of Formula I are particularly surprising in view of the fact that the isomeric 2-methyl-quinolyl-(5) N-methyl-carbamate fails to show such activities.

On testing the pesticidal activity of compounds of general Formula I on insects and spiders it was found that these active substances have a good to very good contact action as well as being stomach poisons for these animals. They also have a very clear systemic action on them.

Thus, it has been found that the active ingredients of the general Formula I have an excellent killing activity against insects of the families Muscidae and Culicidae, e.g. the polyvalent resistant and normally sensitive house flies (*Musca domestica*) and midges (*Aedes aegyptii, Culex fatigans, Anopheles staphensi*), on insects of the families Curculionidae, Bruchidae, Dermestidae, Tenebrionidae and Chrysomelidate, e.g. granary weevils (*Sitophilus granaria*), bean beetles (*Burchidius obtectus*), larder beetles (*Dermestes vulpinus*), yellow meal worms (*Tenebrio molitor*), Colorado potato beetles (*Leptinotarsus decemlineata*) and their stages of development, of the Pyralididae family, e.g. Mediterranean flour moths (*Ephestia kühniella*), and, which is particularly unexpected, also against the Blattidae family, e.g. cockroaches (*Phyllodromia germanica*), the Aphididae family, e.g. bean aphids (*Aphis fabae*) and the Pseudococcidae family, e.g. citrus mealybugs (*Planococcus citri*). Tests on bean aphids (*Aphis fabae*) and desert locusts (*Schistocerca gregaria*) indicate that the substances have an excellent systemic action. Tests as to the acaricidal activity of the active substances of general Formula I on two-spotted spider mites (*Tetranychus urticae*) showed a very good action, particularly on the adult and larval stages.

Thus active substances of the general Formula I can be used as insecticides and acaricides for the protection of warm blooded animals.

It was found that good results were attained on application of the active ingredients in the most various forms for use, for example, as dusts, wettable powders, emulsions or oil solutions, against the insects and spiders mentioned above. The maximal activity of the active ingredients was attained when they were in the form of coatings, the adhesion of which to the surface to be protected is very slight.

The range of action of the substances mentioned is widened by admixture with synergists and other auxiliaries having a similar action such as succinic acid dibutyl ester, piperonyl butoxide, DDT active substance, olive oil, peanut oil, phosphoric acid esters, etc. In the same way, the insecticidal action of the active substances mentioned can be considerably broadened and adapted to given external conditions by the addition of other insecticides such as phosphoric acid esters, other carbamic acid esters, halogenated hydrocarbons, DDT analogues, pyrethrines and synergists thereof, etc.

In order to secure an increased intake of active substance by the pest, the active substances are mixed together with attracting agents such as sugar, honey, sugar-bran or sugar-honey mixtures as well as with other substances, or they are deposited on these substances. Applied to Blattidae, e.g. *Periplaneta americana*, a sugar-bran mixture comprising 0.5% of O-[2-methyl-quinolyl-(8)-]-N-methyl-carbamate leads to a 100% destruction of the test animals within 24 hours.

The new agents may further comprise admixtures of bactericides, fungicides, nematocides as well as of other insecticides, whereby the spectrum of their biological activity is extended.

Pest control agents according to the invention are produced by methods known per se by thoroughly mixing and milling the active substances of general Formula I with suitable carriers optionally with the addition of adhesives, dispersing agents or solvents which are inert to the active substances. These pest control agents can be in the following forms and used as such:

Solid forms: dusts, sprinkling agents, granulates (coated granules, impregnated granules, homogeneous granules),
Water dispersible concentrates of active substances: wettable powders, pastes, emulsions,
Liquid forms: solutions, and forms for the production of aerosols, fogs and fumigants.

To produce the solid forms for use (dusts and sprinkling agents, granulates), the active substances are brought on to solid carriers such as talcum, kaolin, bole, loess, chalk, limestone, ground limestone, ataclay, dolomite, diatomaceous earth, precipitated silicic acid, alkaline earth silicates, sodium and potassium aluminum silicates (feldspar and mica), calcium and magnesium sulfates, magnesium oxide, milled plastics, fertilisers such as ammonium sulphate, ammonium phosphates, ammonium nitrate, urea, etc., and also ground vegetable products such as bark dust, sawdust, ground nutshells, bran, cellulose powder, residues of plant extractions, active charcoal, etc. These carriers can be used alone or admixed with each other.

The particle size of the carriers is, for dusts up to about 100μ, for sprinkling agents from about 75μ–0.2 mm. and for granules from 0.2 mm.–1 mm. (and larger).

As a general rule, the concentrations of active substances in the solid preparations is from 0.5–80%.

To these mixtures can also be added additives which stabilise the active substance and/or non-ionic, anionic and cationic surface active substances which, for example, improve the adhesion of the active substances on plants and plant parts (glues, adhesives) and/or attain better wettability (wetting agents) and dispersibility of the active substances. Examples of such surface active substances are as follows: olein plus hydrate of lime, cellulose derivatives of a medium degree of viscosity (methyl cellulose, carboxymethyl cellulose, hydroxyethyl cellulose), galactomans (guar gum), their anionic and cationic derivatives, polyethylene glycol ethers of mono- and di-alkyl phenols (having 5–15 ethyleneoxide radicals per molecule and 8–9 carbon atoms in the alkyl radical, e.g. the commercial products known under the names "Triton," "Igepal," "Terpitol," etc.), condensation products of ethylene oxide/propylene oxide (medium molecular weight of the polyoxypropylene part: about 1750; e.g. the commercial products known by the name "Pluronics," solid, liquid sulphite waste liquor, alkali metal and alkaline earth metal salts thereof, mineral oils and polyethylene glycol ethers (carbowaxes), fatty alcohol polyethylene glycol ethers (having 5–20 ethylene oxide radicals per molecule and 8–18 carbon atoms in the fatty alcohol moiety; e.g. the commercial products known by the name "Genapol"), dextrins, caseins, their calcium salt, proteins, polyvinyl pyrrolidones, polyvinyl alcohols (e.g. the commercial product known as "Moviol"), condensation products of urea-formaldehyde and also latex products.

In some cases it is necessary to add to these forms for application, plant, animal and mineral oils as penetrating agents, i.e. agents which help and improve the penetration of the active substances into the plants and parts thereof.

The concentrates of active substance which can be dispersed in water: wettable powders, pastes and emulsion concentrates, are agents which can be diluted with water to any concentration desired for application to plants and parts thereof. They consist of active substance, carrier, additives which stabilise the active substance, surface active substances, protective colloids and anti-foaming agents and, optionally, solvents. The concentration of active substance in these agents is 5–80%.

Wettable powders and pastes are obtained by mixing and milling the active substances with surface active substances and pulverulent carriers in suitable mixers and milling machines until homogeneity is attained. Carriers are, for example, those mentioned in the paragraph dealing with solid forms for application. In some cases it is advantageous to use mixtures of carriers. By surface active substances, glues or adhesives, wetting and dispersing agents and protective colloids are to be understood. Of the glues and adhesives already mentioned, because of their properties a number thereof can be used as so-called auxiliary dispersing agents. Other dispersing agents and wetting agents which can be used are:

Condensation products of sulphonated naphthalene and naphthalene derivatives with formaldehyde (e.g. the commercial product "Sellasol"), condensation products of naphthalene and derivatives thereof with phenol and formaldehyde (the commercial products known as "Irgatan"), also aluminium salts of lignin sulphonic acids, further alkylaryl sulphonates, alkali metal salts and alkaline earth metal salts of dibutyl naphthalene sulphonic acid, fatty alcohol sulphates such as salts of sulphated hexadecanols, heptadecanols, octadecanols, octadecenols, the sodium salt of sulphonated hexadecyl glycol ethers (the commercial products known as "Eriopon"), the sodium salt of oleoylmethyl tauride (the commerical product known as "Arkopon"), ditertiary acetylene glycols (the commercial products known as "Surfinol"), dialkyldilauryl amomniu chvcanden amenpr ierss-s,
ammonium chloride (the commercial product known as "Aliquat"), and fatty acid alkali metal and alkaline earth metal salts. Examples of anti-foaming agents are: silicones, Antifoam A, etc.

The active substances are so mixed, milled, sieved and strained with the additives mentioned above that the solid particle size in wettable powders is 20–40μ and in pastes is not more than 3μ. To produce emulsion concentrates and pastes, liquid dispersing agents such as those given in the previous paragraphs, organic solvents and water are used. Examples of solvents are: alcohols, benzene, toluenes, xylenes, dimethyl sulphoxide, dimethyl formamide and mineral oil fractions boiling between 120 and 350°. The solvents must be almost without smell, not phytotoxic, inert to the active substances and not easily inflammable.

The forms for application which can be dispersed in water can also contain other additives to increase the stability to light, penetrating agents, anti-foaming agents and also synergists.

The wettable powders, pastes and emulsion concentrates are diluted with water to the practical concentrations desired which are between 0.01 and 2%, calculated on the active substance. In the composition and concentrations for use described, these forms have good suspendibility which can be further improved, e.g. by the addition of synthetic voluminous silicic acid. The emulsifiable property of the emulsion concentrates is also very good.

In addition, the agents according to the invention can be in the form of and be used as solutions or sprays. For this purpose the active substance or substances of general Formula I are dissolved in suitable organic solvents, mixtures of solvents or in water. Higher aliphatic and aromatic hydrocarbons, chlorinated derivatives thereof, alkyl naphthalenes alone or mixed with each other or with water are preferably used as organic solvents. The solutions contain the active substances in a concentration from 1 to 20%. They are used in the form of spray or mist with suitable spraying or mist blowing equipment.

So-called aerosols are produced from solutions of the active substances by the addition of propellants; aerosols are particularly suitable for use in the house and garden. Both the solutions and the aerosols can contain additives to increase the adhesion, resistance to rain and light, vegetable, animal and mineral oils to improve the adhesion and penetration.

Also the active substances of general Formula I can be worked up with a combustible substance, e.g. sawdust or paper and a source of oxygen such as potassium chlorate and potassium nitrate, to form a fumigant or fumigant paper.

The application forms described of the agents according to the invention can be mixed very well with other biocidally active compounds or with agents containing such compounds. Thus, to broaden the range of action of the pesticides according to the present invention, also other biocidal active substances such as insecticides, fungicides, bactericides, fungistatics, bacteriostatics or nematicides can be incorporated thereinto. The agents according to the invention can also contain fertilisers, plant hormones, etc.

To increase the stability of the active substances, it is advantageous to either admix additives which regulate the pH value such as, e.g. inorganic and organic acids, into the forms for application which are diluted with or contain water as solvent or to add such additives on dilution or dispersion of such forms for application.

The following examples describe the production of various forms of pest control agents according to the invention. Parts are given therein as parts by weight.

Example 1.—Dust 2 parts of O-[2-methyl-quinolyl - (8)]N-methyl-carbamic acid ester, 5 parts of highly dispersed silicic acid and 97 parts of talcum are mixed together and milled. A 2% dust is obtained which can be used, e.g. for the control of German cockroaches and ants, etc. in houses.

The above active substance is produced as follows:

31.8 parts of 2-methyl-8-hydroxyquinoline are dissolved in 150 parts by volume of dimethyl formamide and 40 parts of pyridine (anhydrous). A solution of 40 parts of N-methyl carbamic acid chloride in 60 parts of dimethyl formamide are added dropwise at a temperature of 10–15° while cooling well, the addition being made within 20 minutes. The reaction mixture is then stirred for 6 hours at room temperature. The temperature is then raised to 50–55° and the mixture is stirred for 15 hours at this temperature. To determine whether the reaction has been completed, a sample is taken from the reaction mixture, diluted with ethanol and a few drops of very dilute aqueous solution of iron-III chloride are added. If the reaction is complete, the color should only be a pale green. The reaction mixture is cooled and poured into ice water while stirring. A precipitate is formed which is filtered under suction and washed with ice water. The crude product is dried in vacuo at room temperature. After recrystallization from benzene, the O-[2-methyl-quinolyl-(8)N-methyl carbamic acid ester obtained melts at 136–138° (with decomposition). The yield is 56% of the theoretical.

Example 2.—Wettable powder (a) 50 parts of O-[2-methyl-quinolyl - (8)]N-methyl carbamic acid ester, 5 parts of sulphated hexadecyl glycol ether sodium salt, 2.5 parts of a condensation product of naphthalene sulphonic acid and formaldehyde and 42.5 parts of highly purified silicic acid are intimately mixed and milled in a suitable apparatus. A 50% wettable powder is obtained which can be diluted with water to any concentration desired.

(b) 50 parts of O-[2-methyl-quinolyl - (8)]N-methyl-carbamic acid ester, 5 parts of an alkylaryl sulphonate ("Tinovetin B"), 10 parts of sulphite waste liquor sodium salt, 1 part of a mixture consisting of equal parts of hydroxyethyl cellulose and Champagne chalk, 20 parts of highly dispersed silicic acid and 14 parts of kaolin are intimately mixed and milled in a suitable apparatus. A 50% wettable powder is obtained which can be diluted with water to any concentration desired.

(c) 25 parts of O-[2-methyl-quinolyl - (8)]N-methyl-carbamic acid ester, 5 parts of oleylmethyl tauride sodium salt, 2.5 parts of a condensation product of naphthalene sulphonic acid and formaldehyde ("Sellasol TD"), 0.5 part of carboxymethyl cellulose, 5 parts of neutral potassium aluminium silicate and 62 parts of kaolin are mixed in suitable mixers, mixing rollers and mills. A 25% wettable powder is obtained which can be diluted to concentrations suitable for plant protection.

(d) 10 parts of O-[2-methyl-quinolyl - (8)]N-methyl-carbamic acid ester, 3 parts of a mixture of the sodium salts of saturated fatty alcohol sulphates, 5 parts of a condensation product of sulphonated naphthalene and formaldehyde, and 81 parts of kaolin are intimately mixed and milled in suitable mixers, mills and mixing rollers. A 10% wettable powder is obtained which can be diluted with water to any concentration desired.

Example 3.—Granulate

Starting materials are: 4 parts of the wettable powder described above under (a), 3.5 parts of carbowax 400, 92 parts of ground limestone (particle size 0.4–0.8 mm.) and 0.5 part of highly dispersed silicic acid. The ground limestone is impregnated with carbowax and then the wettable powder is mixed in. When the particles are evenly covered with the wettable powder, the silicic acid is added as anti-caking agent while stirring intensively. A 4% granulate (coated granules) is obtained which is suitable for the protection of plants and stores.

Example 4.—Paste 45 parts of O-[2-methyl-quinolyl-(8)]N-methyl-carbamic acid ester, 5 parts of sodium aluminium silicate, 14 parts of oleyl polyglycol ether with 8 mols of ethylene oxide ("Genapol O–080"), 1 part of oleyl polyglycol ether with 5 mols of ethylene oxide ("Genapol O–050"), 2 parts of spindle oil, 10 parts of carbowax and 23 parts of water are intimately mixed and milled in suitable machines and mills. A paste is obtained which can be diluted with water to any concentration desired.

Example 5.—Emulsion 10 parts of O-[2-methyl-quinoyl-(8)]N-methyl-carbamic acid ester are dissolved in 55 parts of xylene and 32 parts of dimethyl formamide. 3 parts of an emulsifying agent which is a combination product of an alkylaryl ethylene oxide condensation product and of an alkylaryl sulphonic acid salt, are added to this solution. This concentrate can be diluted with water to any desired concentration whereupon an emulsion suitable for the protection of plants and stores is obtained.

Example 6.—Spray (a) 2 parts of O-[2-methyl-quinolyl-(8)]N-methyl-carbamic acid ester are dissolved in 98 parts of water.

(b) 2 parts of O-[2-methyl-quinolyl-(8)]N-methyl-carbamic acid ester are dissolved in 10 parts of xylene and 88 parts of petroleum.

(c) 2 parts of O-[2-methyl-quinolyl-(8)]N-methyl-carbamic acid ester and 3 parts of dichlorodiphenyltrichloroethane active substance are dissolved in 95 parts of kerosene.

These solutions are sprayed with pressure pumps. The solution (a) is advantageously used for the control of bean aphids on fruit trees and other plants. The solutions (b) and (c) are used in particular for the control of flies and midges in houses, storerooms and slaughterhouses.

Tests carried out under strictly comparable conditions with 2-methyl-quinolyl-(8) N-methyl-carbamate (designated as compound A below) on the one hand, and the structurally closest derivatives of the quinonyl-(5) N-methyl-carbamate series, namely 2-methyl-quinolyl-(5) N-methyl-carbamate (designated as compound B below) on the other hand, showed the high insecticidal activity of the former and the lack of insecticidal activity of the latter compound. Tests were carried out with the insects tabulated below, with the results described:

TABLE

| Insect tested | Concentration type of application | Result A | Result B |
|---|---|---|---|
| House fly (*Musca domestica*) | 10 mg./liter contact | 5 hours/100% | No effect. |
| Poly resistant | do | do | Do. |
| Granary weevil (*Sitophilus granaria*) | 0.1%, spray | 48 hours/100% | Do. |
| Larvae of flour moth (*Ephestia kühniella*) | 1%, stomach poison | After 6 days 100% | Do. |
| Larve of potato beetle (*Leptinotarsa decemlineata*) DDT-resistant. | do | 30 minutes 100% | Do. |
| Aphids (*Aphis fabae*) | 0.02% (systemic, uptake by the roots). | 100% after 24 hours | Do. |
| House flies (*Musca domestica*) | 1%, stomach poison (uptake with honey water). | More than 25% after 24 hours. | Do. |
| Mosquitoes (*Aedes aegyptii*) | 1 mg./liter contact | 43 minutes 100% | Do. |

I claim:
1. A method for combatting insects, comprising applying thereto an insecticidally effective amount of O-[2-lower alkyl-quinolyl-(8)] N-methyl-carbamate.
2. A method for combatting insects, comprising applying thereto an insecticidally effective amount of O-[2-methyl-quinolyl-(8)] N-methyl-carbamate.
3. A method for controlling Acarinae comprising applying thereto an acaricidally effective amount of O-[2-methyl-quinolyl-(8)] N-methyl-carbamate.
4. A method for controlling Blattidae comprising applying thereto an insecticidally effective amount of O-[2-methyl-quinolyl-(8)] N-methyl-carbamate.

References Cited

UNITED STATES PATENTS

| | | | |
|---|---|---|---|
| 3,005,823 | 10/1961 | Kaeding | 260—287 |
| 3,362,960 | 1/1968 | Hodel | 260—287 |

LEWIS GOTTS, *Primary Examiner.*

S. K. ROSE, *Assistant Examiner.*

UNITED STATES PATENT OFFICE
CERTIFICATE OF CORRECTION

Patent No. 3,384,538　　　　　　　　　　　　　　　　May 21, 1968

Ernst Hodel

It is certified that error appears in the above identified patent and that said Letters Patent are hereby corrected as shown below:

In the heading to the printed specification, after line 8, insert -- Claims priority, application Switzerland, June 4, 1964, 7,291/64 --. Column 1, line 33, "ingrediennts" should read -- ingredients --; line 68, "Chrysomelidate" should read -- Chrysomelidae --; line 69, "Burchidius" should read -- Bruchidius --. Column 3, line 6, "granules" should read -- granulates --. Column 4, line 5, cancel "amomniu chvcanden amenpr ierss-s,".

Signed and sealed this 27th day of January 1970.

(SEAL)
Attest:

Edward M. Fletcher, Jr.　　　　　　　　　　WILLIAM E. SCHUYLER, JR.
Attesting Officer　　　　　　　　　　　　　　Commissioner of Patents